March 2, 1937. J. B. McMULLEN 2,072,310
VEHICLE WINDOW
Filed Jan. 25, 1932   4 Sheets-Sheet 1

Inventor
Joseph B. McMullen

March 2, 1937. J. B. McMULLEN 2,072,310
VEHICLE WINDOW
Filed Jan. 25, 1932 4 Sheets-Sheet 2
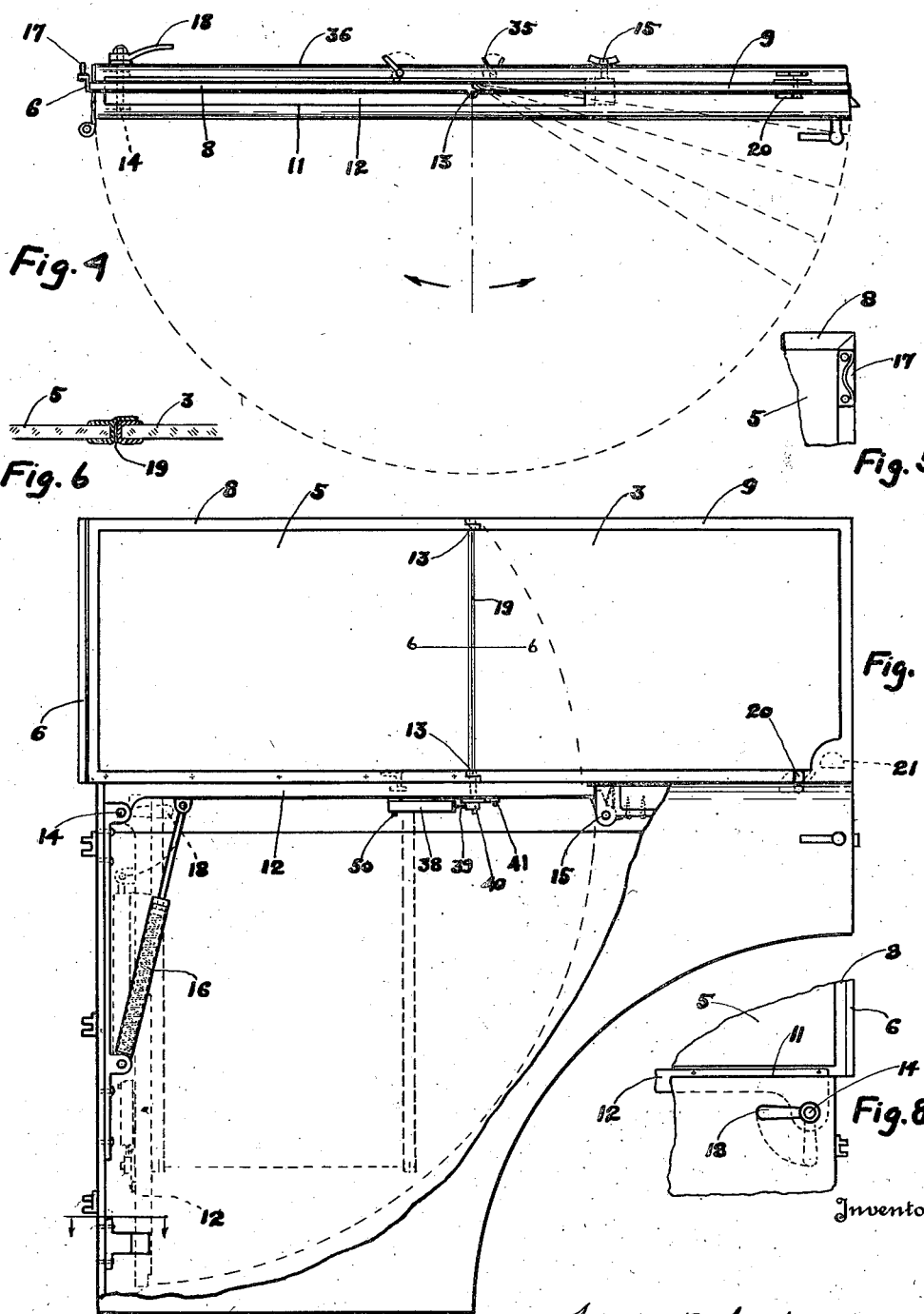
Inventor
Joseph B. McMullen March 2, 1937. J. B. McMULLEN 2,072,310
VEHICLE WINDOW
Filed Jan. 25, 1932 4 Sheets-Sheet 3
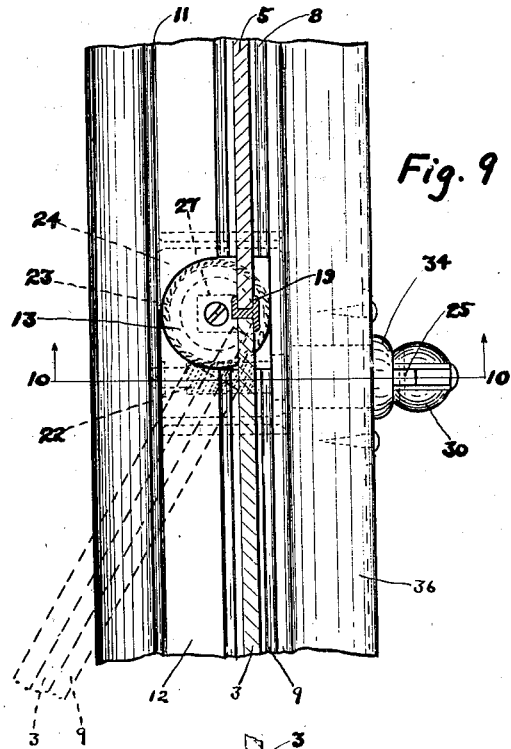
Fig. 9
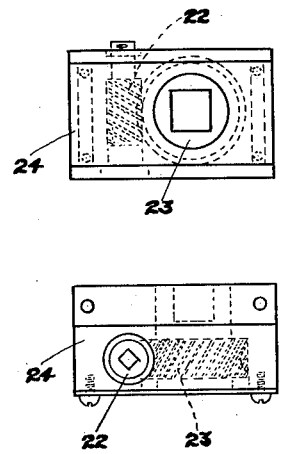
Fig. 12
Fig. 13
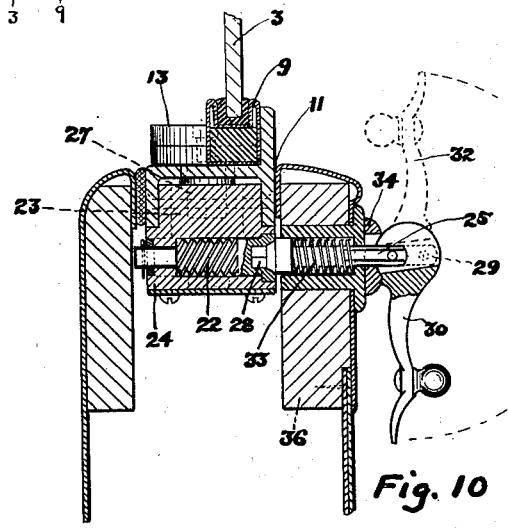
Fig. 10
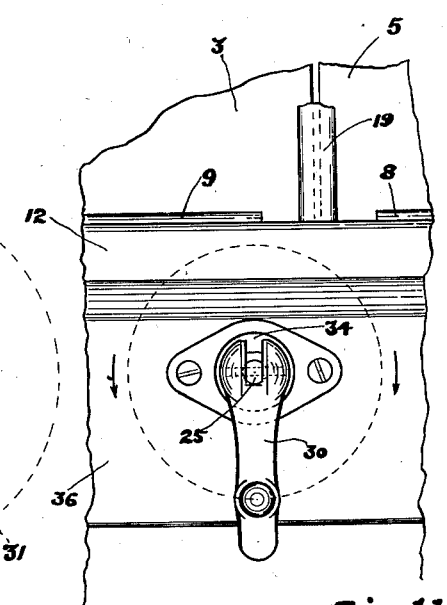
Fig. 11
Inventor
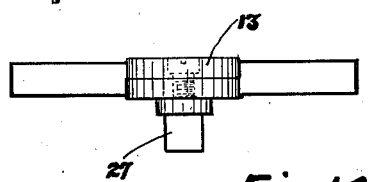
Fig. 14
Joseph B. McMullen Patented Mar. 2, 1937

2,072,310

UNITED STATES PATENT OFFICE 2,072,310

VEHICLE WINDOW

Joseph B. McMullen, Washington, D. C.

Application January 25, 1933, Serial No. 653,532

14 Claims. (Cl. 296—45)

This invention relates to windows adaptable to motor cars and other types of vehicles and has as an object the provision of a window which when in operation gives protection to the interior of the vehicle at the same time allowing a portion of the window to be adjusted in such manner as to allow ventilation from the body of the vehicle without causing draft or the entrance of the elements into the body of the vehicle.

A further object of the invention is to provide a portion of the window hinged in such manner as to allow signaling by hand in cold and inclement weather without lowering the window and at the same time preventing a draft or the entrance of the elements into the body of the vehicle.

A further object of this invention is to provide a portion of the window hinged in such manner and actuated by a control so as to allow a fixed position for purposes of ventilation, and a locked position when entirely closed.

A further object of this invention is to provide when a plurality of windows are in line with each other, a weather tight joint between the forward and back windows, such weather tight joint to be an integral part of the windows thus alleviating the necessity of a pillar post.

A further object is to provide a window structure that could be applied to doors in such manner as to make these doors interchangeable with what is known as the sedan or coupe type with that of the conventional convertible bodies.

A further object of this invention is to provide cushioning means for the vertically hinged transparent member during its arc of travel.

And it is a further object of the invention to provide a window having folding portions which can be very quickly manipulated, both to exclude draft and the elements and the entire removal of the window when desired.

Referring to the accompanying drawings:

Fig. 4 is a plan view of the top of a door showing the window in closed position, with radial dotted lines indicating the various positions of the vertical pivoted portion of the window for purposes of ventilation, and the half circle dotted line indicating the movement of the vertical pivoted member from closed to open position or vice versa.

Fig. 5 is a view of the upper forward corner of the window and frame with a clip attached which is used to lower and raise the window.

Fig. 6 is a section at line 6—6 of Fig. 7 showing a weather tight joint.

Fig. 7 is a side elevation of a door with a cutaway section of the outer paneling with the window in operation, how it is held in place, and by the dotted lines how it is swung down into the pocket of the door entirely out of the way, also the counterbalancing spring means to assist in raising and lowering the window, also the sub or main frame extending beyond the axis of the vertical hinged portion and the method of pivoting this frame and locking it when in upright position.

Fig. 8 is a view of the inside upper corner of the door with the window in position of closure showing a handle fastened to the sub or main frame, this handle is intended to swing up or down the window when desired.

Fig. 9 is a plan view at the point of the vertical hinged section with cutaway sections indicating the two transparent mediums of the window.

Fig. 10 is a cross section view at line 10—10 of Fig. 9 looking in the direction of the arrows and illustrates a geared method of controlling the hinged vertical portion.

Fig. 11 is a side elevation of Fig. 10.

Fig. 12 is a plan view of the gear housing which operates the vertical hinged window portion as illustrated by Figs. 9–10–11.

Fig. 13 is a side elevation of Fig. 12.

Fig. 14 is a view of the lower hinge of the vertical hinged portion.

Figure 15:
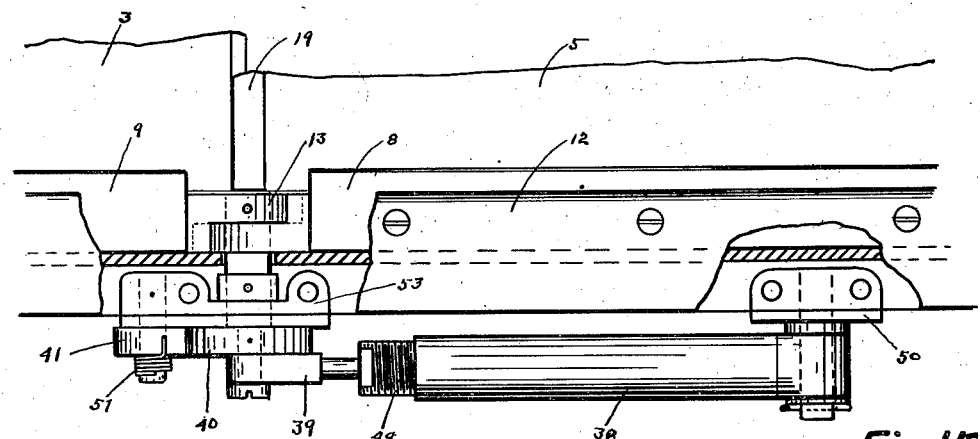

Fig. 15 is a side view of a controlling mechanism to operate the vertical hinged portion, with a section of the sub frame cut away.

Figure 16:
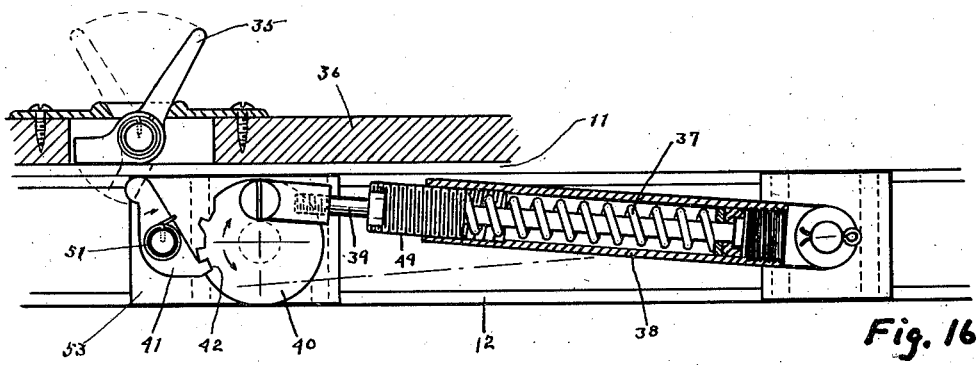

Fig. 16 is a view looking at the bottom of the sub frame at the point shown in Fig. 15 with a cutaway portion of the inside panel in which is mounted a controlling latch mechanism, and it also shows a cutaway portion of the spring which motivates the vertical pivoted portion.

Figure 17:
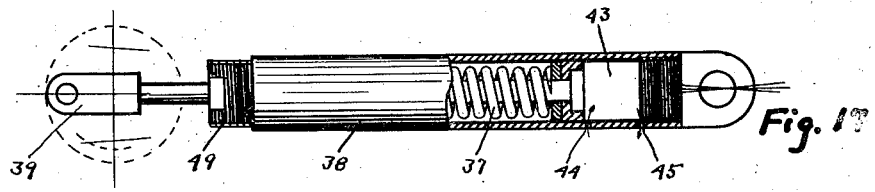

Fig. 17 is a view of this motivating spring mechanism partly cut away, showing an air cushion to prevent the too rapid movement of the vertical hinged portion.

Figure 18:
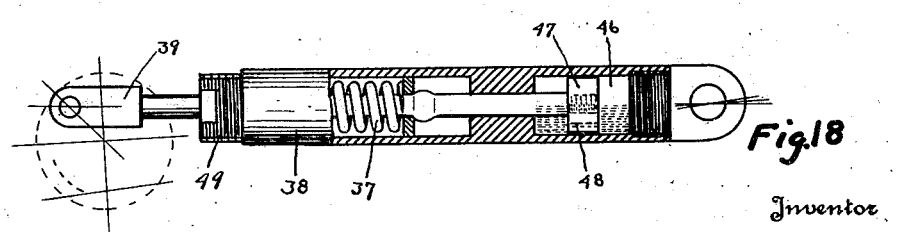

Fig. 18 is a view of this motivating spring mechanism partly cut away showing a fluid cushion instead of air.

Figure 1:
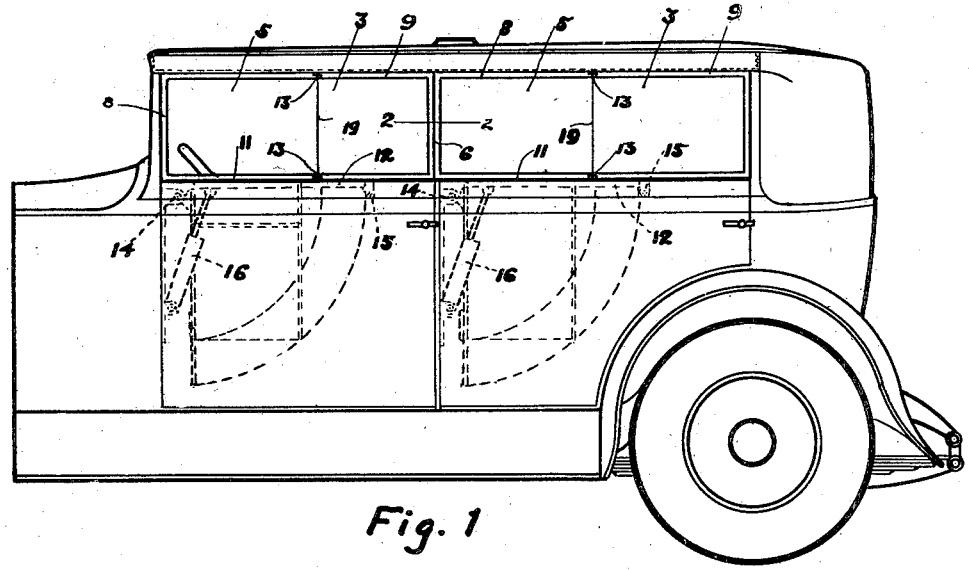
Fig. 1 is a side elevation of an automobile body showing two doors with the windows in operation and their folded position as indicated by the dotted line.
Figure 2:
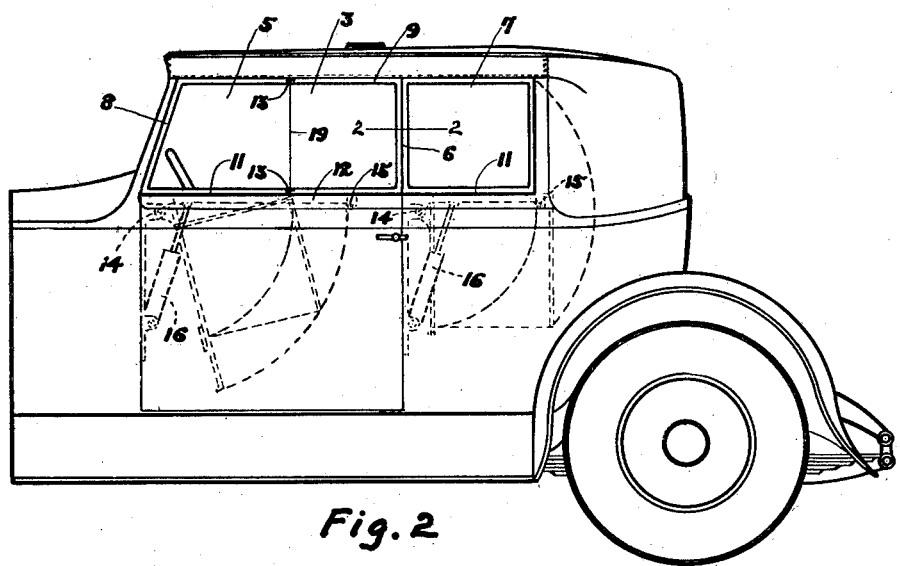
Fig. 2 is a side elevation of an automobile body showing one door and a panel portion with the windows in operation with the folded position of the windows indicated by the dotted lines.
Figure 3:
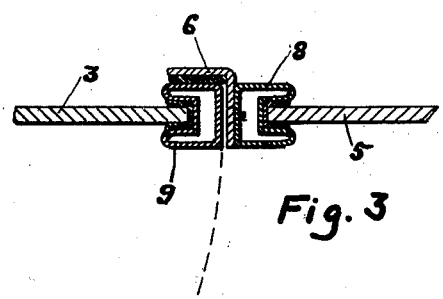
Fig. 3 is a section of the windows at line 2—2 of Figs. 1 and 2 and illustrates the weather tight joint between these windows.

In carrying out the invention as applied to an automobile whether of the sedan or convertible type, each window comprises two transparent sections 3, with the possible exception of when a rear window is employed on such a body as shown by 7 in Fig. 2, 7 in this case the window swings back and down through a recess in a portion of the upper body structure. The transparent medium is held in place by suitable frame members 8, and 9.

In the top of the door or panel section there is a slot 11 through which the window swings down in folded position, when in operative position the main carrying frame 12 completely fills slot 11 and extends beyond the axis of the vertical hinged transparent portion 3. One end of the main carrying frame 12 is pivoted or hinged at 14 and when swung up in place is locked in position automatically by lock 15. In order to counterbalance the weight of the window when it is being swung up or down, spring 16 with suitable connections is employed. In order to assist in lowering or raising the window, clip 17 on the upper forward end of frame 8, or a handle 18, fastened to the axis of frame 12, may be employed.

To close down the window, frame 9 carrying the transparent medium 3 is swung around so that it nests against and parallels frame 8, lock 15 is then released and the whole mechanism can then be swung down into the pocket of the door or panel, to bring the window into operation it is simply swung back into place, the vertical pivoted portion 9 carrying light 3 can then be swung around to the desired closure.

At the hinged joint 13, 13, a weather proof connection is provided by 19 see Fig. 6, to hold the vertical hinged portion of the frame 9 in snug position for complete closure, an additional locking means may be provided as shown by 20. The dotted line 21 indicates a finger recess in frame 9 to assist in operating this vertical hinged portion.

In this invention as presented I show two methods of controlling the vertical hinged portion 9 which carries light 3. In the form of the invention shown in Figs. 9, 10, 11, 12, 13, 14, I provide a gear rack 22, 23, housed in a block 24 operated through shaft 25. Gear 23 engages shoulders of lug 27 on hinge 13, then through the medium of shaft 25 with its head 28 engaging gear 22, operated by handle 30, the vertical hinged portion 9 can then be moved to any desired position and is locked automatically in such position. To disengage the head 28 of shaft 25 from gear 22 it is necessary to swing the handle through an arc as indicated by the dotted line 31 see Fig. 10. This handle 30 is pivoted eccentrically to shaft 25 and by turning this eccentric over, the shaft assumes a position as indicated by dotted line 29. When head 28 of shaft 25 is withdrawn from contact with gear 22 the main carrying frame 12 is then in a position to be swung into and out of working position. To engage the handle mechanism to the gear rack this operation from dotted position 32 is reversed. 33 is a spring which holds the handle 30 in fixed position and pushes the shaft 25 inwardly and causes engagement of the head 28 with gear 22, and 34 is a slotted washer to hold the eccentric portion of handle 30 in correct position.

In the form of the invention as shown in Figs. 4, 7, 15, 16, 17, and 18, I provide spring means to actuate the vertical hinged portion 9 which carries the transparent medium 3 and controlled by means of latch 35 on the inner portion of the door or panel 36. The motivating spring 37 operating in housing 38 works through piston rod connection 39 which in turn is connected with the toothed wheel 40, actuating the vertical hinged portion 9 which is connected to said wheel 40 from the position of complete closure to that of its folded position against frame 8.

To operate the vertical hinged section 9 from a closed position when motivated by this spring mechanism, the latch 35 is tripped, which in turn removes the pawl 41 from the locked notch 42 in wheel 40. The vertical hinged portion 9 can then be pushed out to the desired angularity, the pawl 41 through the medium of spring 51 engages the ratchet formation on wheel 40 and holds the frame portion at the desired angle. When frame 9 is pushed out from locked position beyond 45 degrees the piston rod 39 then passes the dead center and pulls the frame 9 against the fixed frame 8 and holds it there, in this position the entire window mechanism can then be swung down into the slot 11 of the door or panel.

In order to prevent the vertical hinged section 9 from closing too rapidly, a cushioning means is provided, see Figs. 17 and 18. Fig. 17 shows an air cushion 43 with vents 44 and 45. In Fig. 18 an hydraulic type is used with fluid partly filling the aperture 46 and taking its place on either side of the piston head 47 flowing through the hole 48.

To adjust the spring tension of spring 37 there is provided a screw plug 49 through which the piston rod 39 operates. This motivating spring mechanism is pivoted to bracket 50 so as to allow the desired swinging movement through its various positions.

It can be seen that this window may be utilized in a number of ways; from a complete closure to a position where it is entirely out of the way. With the vertical hinged portion partly open the air is deflected outwardly and by such action the air in the body of the vehicle constantly changes, as the deflected air causes a slight vacuum at the outer edge of the opening and pulls the air out of the vehicle. The driver may signal by hand through the aperture of the vertical hinged portion 9 without the entrance of draught or the elements into the body of the vehicle. This vertical hinged portion 9 when the window is entirely closed locks automatically and can only be released from the interior of the vehicle.

I claim:

1. A window on a wall structure of a vehicle, said wall structure having an opening at its top, a frame member to substantially close said opening, said frame member being hinged at one end and movable about said hinge, locking means to hold said frame member parallel with said opening in said wall structure when in operative position, transparent means mounted on said frame member, one portion of said transparent means being fixed immovably to said frame member and a vertically hinged transparent member mounted on said frame member for outward and forward swinging movement beyond the vehicle, said vertically hinged member controlled by means movable around its own axis.

2. A window structure for a wall member comprising in combination two transparent sections having adjacent vertical edges, each section mounted on a common frame member, one section rigidly mounted on said common frame member and the other section pivotedly mounted with respect to said common frame member, said common frame member having one end extending beyond the axis of said pivot and being hinged at its opposite end in said wall member and movable about its own hinge mounting, and locking means to hold said common frame member when in operative position.

3. A window structure comprising in combination two transparent sections having adjacent vertical edges, said transparent sections mounted in common on a frame member, one of the transparent sections rigidly mounted on said frame member and the other transparent section hinged on said frame member in such manner as to allow an outwardly swinging movement in the direction of the fixed transparent section, the pivoted transparent section actuated by spring means to force it through the desired arc of operation, and means for holding said pivoted transparent section at various positions around its pivoted axis.

4. In a window for a wall structure comprising in combination two transparent sections having vertical hinged connections and both mounted on a common frame member, said common frame member hinged at one end in said wall structure, supporting means to hold said common frame member in operative position, one of said transparent sections rigidly mounted on said common frame member, and the other transparent section hinged in such manner as to allow an arc of travel to and from a complete closure to a position paralleling the rigidly mounted transparent section, means for cushioning said transparent hinged section through its swinging movement, and means for controlling said transparent hinged section at various degrees through its arc of travel.

5. In a collapsible window structure comprising in combination, a wall section, a slot in said wall section, a carrying frame member substantially filling the opening of said slot when in operative position, said carrying frame member pivoted at one end in said slot and movable about said pivot, locking means to hold said carrying frame member in operative position, counter-balancing means for said carrying frame member, two transparent members mounted on said carrying frame member, one of said transparent members immovably mounted on said carrying frame member, the other transparent member pivotally mounted on said carrying frame member at a point adjacent to the outer swinging end of said carrying frame member, said pivotally mounted transparent member being foldable parallel with the immovably mounted transparent member, and means to hold said pivotally mounted transparent member at various fixed positions.

6. A window structure comprising in combination two separate transparent means, said transparent means mounted on a common frame member, said common frame member hinged at one end in a wall structure, locking means to hold said common frame member in operative position, counterbalancing means for said common frame member, one of said transparent means immovably fixed to said common frame member, the other said transparent means pivotally mounted on said common frame member, said transparent means having its pivoted axis between said fixed transparent means and the end of said common frame member remote from its hinged connection, said pivotally mounted transparent means to act as a deflector of air currents when positioned for such purpose, and means for controlling said pivoted transparent means through its desired arc of operation.

7. A collapsible window structure comprising in combination a wall portion having an opening in its top, said opening being sufficiently deep to house said window structure when in collapsed position, said window structure comprising two transparent members, said transparent members mounted on a swinging frame member, said swinging frame member being hinged at one end in said wall portion, means to hold said swinging frame member parallel with said opening in said wall portion, one of said transparent members rigidly fixed to said swinging frame member, the other transparent member pivotally mounted on said swinging frame member, the pivoted axis of said transparent member being positioned between the said fixed transparent member and the outer end of said swinging frame member, said pivoted transparent member being movable through an arc of travel to and from a complete closure to a position paralleling the rigidly fixed transparent member, and means for controlling said pivotally mounted transparent member at various degrees through its arc of travel.

8. In a collapsible window structure comprising in combination two transparent members, a wall section having an opening in its top, a hinged frame member substantially filling said opening in said wall structure when in operative position, means to hold said hinged frame member parallel with said opening in said wall section, one of said transparent members rigidly fixed to said hinged frame member and having one of its edges located at a point adjacent to the hinged connection of said hinged frame member, the other transparent member being pivotally mounted on said hinged frame member with its pivoted axis situated between an opposite edge of said fixed transparent member and the outer end of said hinged frame member, said pivoted transparent member being movable to and from a complete closure to a position paralleling said fixed transparent member, means for operating said pivoted transparent member through its desired arc of travel, and means to hold said pivoted transparent member at various fixed positions.

9. In a window structure the combination of a supporting member, a plurality of transparent sections mounted on said supporting member, at least one of said transparent sections being pivotally mounted for movement in a horizontal plane in respect to another of said sections, means associated with the pivoted section whereby said section may be opened manually and outwardly to a predetermined point and thereafter further moved automatically to occupy a plane substantially parallel with at least another of said sections, and means for cushioning the movement of the pivoted transparent section during its automatic operation.

10. A window structure for a wall section comprising in combination an inner and an outer wall section arranged to provide an opening therebetween, a supporting member located between said wall sections, a pivot for the supporting member, means for raising and lowering the supporting member about said pivot, a transparent member pivotally mounted on said supporting member for oscillation about a vertical axis, impelling means associated with said pivotal mounting and connected thereto for oscillating said transparent section and means accessible from the exterior of one of said wall sections for actuating the impelling means.

11. In a window structure the combination of a support, a pivot for the support, means for raising and lowering the support about said pivot, a transparent section carried by said support and mounted for oscillation about a vertical pivot, and means associated with and connected to the vertical pivot for at times oscillating the said transparent section and at other times for locking said section against movement.

12. In a window structure the combination of a support, a pivot for the support, means for raising and lowering the support about said pivot, a transparent section carried by said support and mounted for oscillation about a vertical pivot, and a self-locking operator associated with and connected to the vertical pivot whereby at times said transparent section may be oscillated to and at other times maintained against movement in an infinite number of positions throughout its range of oscillation.

13. In a window structure the combination of a support, a pivot for the support, means for raising and lowering the support about said pivot, a transparent section carried by said support and mounted for oscillation about a vertical pivot, a gear connected to and mounted concentrically in respect to said pivot, a second gear meshing with the first named gear, and means associated with the second named gear for manually actuating the same whereby the transparent section may be moved to an infinite number of positions throughout its range of oscillation and locked in any of said positions.

14. A window structure for a wall section comprising in combination an inner and outer wall section arranged to provide an opening therebetween, a supporting member located between said wall sections and provided with a pivotal mounting at one end thereof to permit a raising and lowering motion of said member, a plurality of transparent sections mounted on said supporting member, at least one of said transparent sections being pivotally mounted on said supporting member for oscillation about a vertical pivot, a self-locking operator associated with and connected to the vertical pivot when the pivoted transparent section is in raised position whereby at times said transparent section may be oscillated to and at other times maintained against movement in an infinite number of positions throughout its range of movement including a position wherein the transparent section is brought to rest substantially parallel to another of said transparent sections and means for swinging said transparent sections in a vertical plane to a lower position within the wall section.

JOSEPH B. McMULLEN.